United States Patent
Sakakibara et al.

[11] Patent Number: 5,918,475
[45] Date of Patent: *Jul. 6, 1999

[54] AIR CONDITIONING APPARATUS FOR VEHICLE, USING A FLAMMABLE REFRIGERANT

[75] Inventors: Hisayoshi Sakakibara, Nishio; Shin Nishida, Anjo, both of Japan

[73] Assignee: Denso Corporation, Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/722,607

[22] Filed: Sep. 27, 1996

[30] Foreign Application Priority Data

Oct. 11, 1995 [JP] Japan ................................. 7-263295
Oct. 11, 1995 [JP] Japan ................................. 7-263296

[51] Int. Cl.$^6$ ............................. F25D 17/04; B60H 1/32; F25B 49/00
[52] U.S. Cl. ............................ 62/186; 62/244; 62/126; 62/127; 62/129
[58] Field of Search ................. 62/125, 126, 127, 62/129, 186, 244; 454/236

[56] References Cited

U.S. PATENT DOCUMENTS

| | | | |
|---|---|---|---|
| 4,138,856 | 2/1979 | Orlowski | 62/127 X |
| 4,711,096 | 12/1987 | Krantz | 62/129 |
| 5,385,028 | 1/1995 | Gavlak . | |
| 5,461,875 | 10/1995 | Lee et al. | 454/236 X |

FOREIGN PATENT DOCUMENTS 44 26 339 C1  8/1995  Germany .
U5854904  4/1983  Japan .

OTHER PUBLICATIONS

Patent Abstracts of Japan, vol. 12, No. 332, Sep. 8, 1988, JP 63 093613.

Patent Abstracts of Japan, vol. 11, No. 368, Dec. 2, 1987, JP 62 143712.

Primary Examiner—Christopher Kilner
Attorney, Agent, or Firm—Harness, Dickey & Pierce, PLC

[57] ABSTRACT

According to the present invention, when leakage of refrigerant is detected during operation of an air conditioning apparatus for a vehicle, air outlets for a passenger and a solenoid valve for an air passage are closed. Accordingly, a compressor is stopped after a predetermined time has elapsed since the solenoid valve is closed. In this way, refrigerant within an evaporator is sucked and discharged. Consequently, an amount of refrigerant leaking from an air conditioner casing due to damage of the evaporator can be reduced.

16 Claims, 6 Drawing Sheets

AIR CONDITIONING APPARATUS FOR VEHICLE, USING A FLAMMABLE REFRIGERANT

CROSS REFERENCE TO RELATED APPLICATIONS

This application is based on and claims priority of Japanese Patent Application Nos. Hei. 7-263295 filed on Oct. 11, 1995 and Hei. 7-263296 filed on Oct. 11, 1995, the content of which are incorporated herein by reference.

BACKGROUND OF THE INVENTION

1. Field of the Invention

The present invention relates to an air conditioning apparatus for a vehicle, which employs a flammable refrigerant.

2. Description of Related Art

An air conditioning apparatus for a vehicle, employing a flammable refrigerant of propane gas or the like, has been proposed recently in view of the tendency of non-Freon refrigerant for an air conditioning apparatus.

There has been also proposed a device for preventing leakage of refrigerant of an air conditioning apparatus for a vehicle employing a flammable refrigerant as disclosed in JP-U-58-54904 for example. More specifically, a gas sensor for detecting leakage of refrigerant is provided within a passenger compartment (cabin) or within the air conditioning apparatus for a vehicle. Accordingly, refrigerant leakage is monitored constantly (including time period during which the engine stops such as when the vehicle is parked), and when leakage of refrigerant has been detected, an inside/outside air switching door is set in an outside air introduction state and a rotation direction of a blower is reversed, and an air-mix door is set in a maximum cooling state, so that leaked refrigerant is discharged outside the vehicle.

On the other hand, an evaporator, a heater core, the air-mix door, and the like are disposed in an air passage of the air conditioning apparatus for a vehicle, and therefore passage resistance (pressure loss) is large, and a sufficient amount of blown air cannot be assured with an axial-flow fan. Accordingly, a scirocco fan is generally employed as the fan for a blower to keep its compactness while assuring a sufficient amount of blown air.

For this reason, in the blower of an air conditioning apparatus for a vehicle, as characteristics of the scirocco fan generally relates to the shape of the scroll casing, the direction of blown air is not reversed even when the scirocco fan is reversely rotated.

Consequently, according to the above device in which the blower is reversely rotated, the leaked refrigerant cannot be certainly discharged outside the vehicle. Therefore, there may be a problem that the passenger compartment is filled with the refrigerant while the air conditioning apparatus is stopped and the passenger is absent, such as when the vehicle is parked.

SUMMARY OF THE INVENTION

In light of the foregoing problem, it is an object of the present invention to provide an air conditioning apparatus for a vehicle, capable of preventing the refrigerant from flowing into the passenger compartment even when the refrigerant is leaked from an air conditioning equipment.

According to a first aspect of the present invention, when a detected value detected by a refrigerant detecting device is a predetermined value or more during an operation of the air conditioning apparatus for a vehicle, an air passage in an air conditioner casing is closed. In this way, since the air passage is closed when leakage of refrigerant is detected during the operation of the air conditioning apparatus, refrigerant which has leaked into the air conditioner casing is enclosed within the air conditioner casing. Consequently, it can be prevented that the interior of the passenger compartments filled with the refrigerant.

Further, a compressor may be stopped after a predetermined time has elapsed since a solenoid valve is closed when a detected value detected by the refrigerant detecting device during an operation of the air conditioning apparatus is a predetermined value or more. In this way, since the operation of the compressor is stopped after a predetermined time has elapsed since the solenoid valve is closed when leakage of refrigerant is detected during the operation of the air conditioning apparatus, and the refrigerant within the evaporator can be sucked and discharged. Consequently, the amount of refrigerant leaking out within the air-conditioner casing due to damage of the evaporator can be reduced, and it can be prevented that the interior of the passenger compartment is filled with the refrigerant.

Still further, the compressor may be stopped after a predetermined time has elapsed since the solenoid valve is closed when a stop of the air conditioning apparatus has been instructed by an instructing device during the operation of the air conditioning apparatus. In this way, the operation of the compressor is stopped after a predetermined time has elapsed since the solenoid valve is closed when a stop of the operation is instructed during the operation of the air conditioning apparatus, and refrigerant within the evaporator can be sucked and discharged. Consequently, refrigerant within the evaporator is sucked and discharged even if damage occurs so that refrigerant leaks out from the evaporator after the air conditioning apparatus is stopped, and the amount of refrigerant leaking into the air conditioner casing can be reduced.

Still further, a blower may be stopped after a predetermined time has elapsed since the solenoid valve is closed when a detected value detected by the refrigerant detecting device during the operation of the air conditioning apparatus is a predetermined value or more. In this way, since the blower is stopped when leakage of refrigerant is detected during the operation of the air conditioning apparatus, forced airflow toward the passenger compartment does not occur within the air passage. Consequently, leaked refrigerant can be suppressed from flowing into the passenger compartment.

According to a second aspect of the present invention, an air passage in an air conditioner casing is closed by an air passage opening-closing device when the air conditioning apparatus for a vehicle is stopped.

In this way, since the air passage is closed by the air passage opening-closing device when the air conditioning apparatus is stopped, refrigerant can be stopped within the air conditioner casing, even when refrigerant leaks into the air conditioner casing while the air conditioning apparatus is stopped and a passenger is absent, such as when parked. As a result, it can be prevented that the interior of the passenger compartment is filled with the refrigerant.

Further, a refrigerant detecting device may be disposed on an upstream air side of the air passage opening-closing device. Accordingly, an air passage is closed when a detected value detected by the refrigerant detecting device is a predetermined value or more when a starting of the air conditioning apparatus has been instructed by an instruction device.

In this way, since a closed state of the air passage is maintained by the air passage opening-closing device when a detected value detected by the refrigerant detecting device is a predetermined value or more when a starting of the air conditioning apparatus has been instructed by the instruction device, the refrigerant can be prevented from flowing into the passenger compartment.

Still further, a stopped state of a blower may be maintained when a detected value detected by the refrigerant detecting device is a predetermined value or more when a starting of the air conditioning apparatus has been instructed by the instruction device.

In this way, since a stopped state of the compressor is maintained when a detected value detected by the refrigerant detecting device is a predetermined value or more when a starting of the air conditioning apparatus has been instructed by the instruction device, refrigerant pressure within the refrigeration cycle does not rise. Consequently, a differential between refrigerant pressure within the refrigeration cycle and atmospheric pressure does not expand, and refrigerant can be prevented from flowing leaking into the passenger compartment.

Additionally, because the compressor does not operate while being in a state where an amount of refrigerant has leaked out and the refrigerant of the air conditioning apparatus has decreased, problems such as seizure or the like of the compressor can be prevented.

Still further, a stopped state of a compressor may be maintained when a detected value detected by the refrigerant detecting device is a predetermined value or more when a starting of the air conditioning apparatus has been instructed by the instruction device.

In this way, since a stopped state of the blower is maintained when a detected value detected by the refrigerant detecting device is a predetermined value or more when a starting of the air conditioning apparatus has been instructed by the instructing device, forced airflow toward the passenger compartment does not occur. Consequently, the leaked refrigerant can be suppressed from flowing into the passenger compartment.

Still further, an inside air introduction inlet and an outside air introduction inlet may be closed when the air conditioning apparatus is stopped.

In this way, since the two induction ports and the air passage are closed when the air conditioning apparatus is stopped and the refrigerant detecting device is disposed in a closed space thereof, the concentration of refrigerant (for example refrigerant which has leaked from the evaporator) flowing in the air passage becomes higher than in a case where the air passage is open, and therefore probability of detection of leaked refrigerant by the refrigerant detecting device becomes higher. As a result, refrigerant leakage detection accuracy of the refrigerant detecting device can be improved.

Still further, a first valve device and a second valve device may be disposed on a side of the inflow port and on a side of the discharge port, respectively. These two valve devices close off refrigerant flowing into the inflow port and from the discharge port when the air conditioning apparatus is stopped.

Since the first valve device and second valve device for enclosing the refrigerant within the evaporator when the air conditioning apparatus is stopped are provided on a side of the inflow port and on a side of the discharge port, respectively, and the maximum amount of refrigerant which may leak from the evaporator while the air conditioning apparatus is stopped and a passenger is absent, such as when parked, is only the amount remaining within the evaporator. Consequently, the amount of refrigerant leaking into the passenger compartment can be suppressed.

Further, a third valve device may be provided between the first valve device and the second valve device, the third valve device is controlled so as to discharge refrigerant existing between the first and second valve devices to outside the passenger compartment when a detected value detected by the refrigerant detecting device refrigerant is a predetermined value or more.

In this way, since refrigerant existing between the first valve device and the second valve device can be discharged to outside the passenger compartment by the third valve device when a detected value detected by the refrigerant-detecting device is a predetermined value or more, an amount of refrigerant leaking into the passenger compartment can further be suppressed.

Still further, the first, second, and third valve devices may be disposed outside the passenger compartment.

In this way, since the first, second and third valve devices are disposed outside the passenger compartment, piping connection portions having a high possibility of refrigerant leakage are disposed outside the passenger compartment. Consequently, the refrigerant can be prevented from flowing into the passenger compartment.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PREFERRED EMBODIMENTS

A first embodiment according to this invention will be described hereinafter with reference to the drawings.

Figure 1:
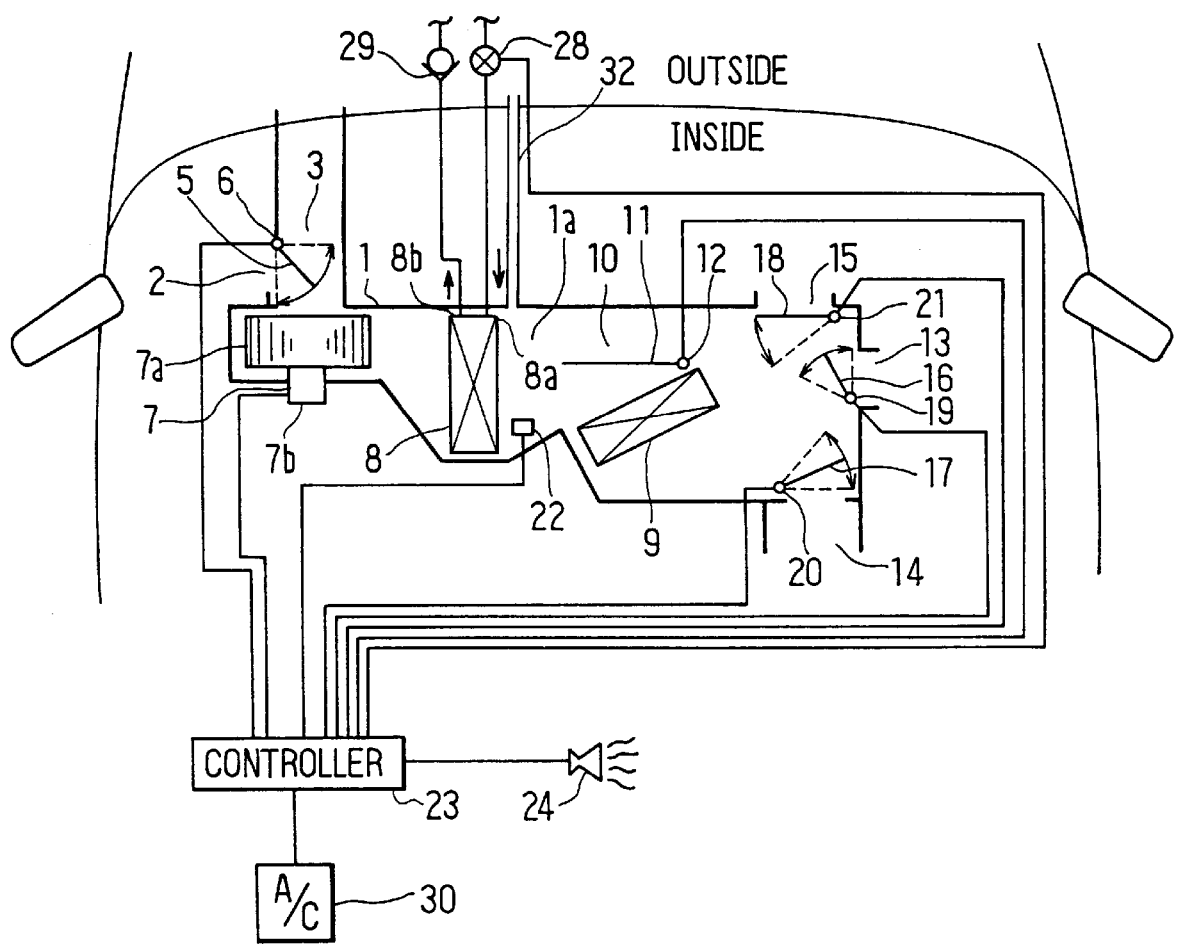
FIG. 1 is a schematic drawing indicating a ventilation system and a control system of an air conditioning apparatus for a vehicle according to a first embodiment of the present invention.

FIG. 1 is a schematic drawing of a ventilation system and a control system of an air conditioning apparatus according to the first embodiment, and the air conditioning apparatus will be described with reference to FIG. 1.

An air conditioner casing 1 forms an air passage 1a, and an inside air introduction inlet 2 for introducing inside air inside a passenger compartment and an outside air introduction inlet 3 for introducing air outside the passenger compartment are formed on an upstream air side in the air conditioner casing 1. A switching door 5 for selectively opening or closing these two introduction inlets 2 and 3 is provided, and the switching door 5 is driven by drive unit 6 (specifically, a servomotor).

A blower 7 is disposed on a downstream air side of the switching door 5. The blower 7 is driven by a scirocco fan 7a and a drive unit 7b (specifically, a blower motor), and fan speed, i.e., an amount of air blown into the passenger compartment, is controlled by blower voltage applied to the blower motor 7b.

An evaporator 8 for cooling air is disposed at a downstream air side of the scirocco fan 7a, and a drainpipe 32 communicated with an outside of the passenger compartment is disposed in the air conditioner casing 1 on a downstream air side of the evaporator 8. A heater core 9 for heating air with coolant water of an engine (not illustrated) as a heat source is disposed on a downstream air side of the drainpipe 32. The evaporator 8 cools air by using a refrigeration cycle which will be described later.

An air-mix door 11 for adjusting a ratio of air passing through the heater core 9 and air passing through a bypass passage 10 so as to bypass the heater core 9 is disposed on an upstream side of the heater core 9. This air ratio is adjusted by adjusting a degree of opening of the air-mix door 11, and the air-mix door 11 is driven by a drive device 12 (specifically, a servomotor).

A face air outlet 13 for blowing out conditioned air toward the upper body of a passenger in the passenger compartment, a foot air outlet 14 for blowing out conditioned air toward the feet of the passenger in the passenger compartment, and a defroster air outlet 15 for blowing out conditioned air toward an inner side of a windshield (not illustrated) are formed at the most downstream air side in the air conditioner casing 1.

Accordingly, air outlet doors 16, 17 and 18 are respectively disposed in the above-described air outlets 13, 14 and 15. These air outlet doors 16, 17 and 18 are driven by drive units 19, 20 and 21 (specifically, respective servomotors). In this embodiment, the air outlet doors 16, 17 and 18 open or close the air passage 1a.

A gas sensor 22 detects refrigerant which has leaked from the air conditioner casing 1. The gas sensor 22 is disposed in the air conditioner casing 1 on the downstream air side of the evaporator 8. The gas sensor 22 cooperates with a controller 23 so as to monitor the leakage of refrigerant constantly. A warning device 24, such as a bell or warning light, warns the passenger of refrigerant leakage when refrigerant has leaked.

The refrigeration cycle will be described with reference to FIG. 2.

Figure 2:
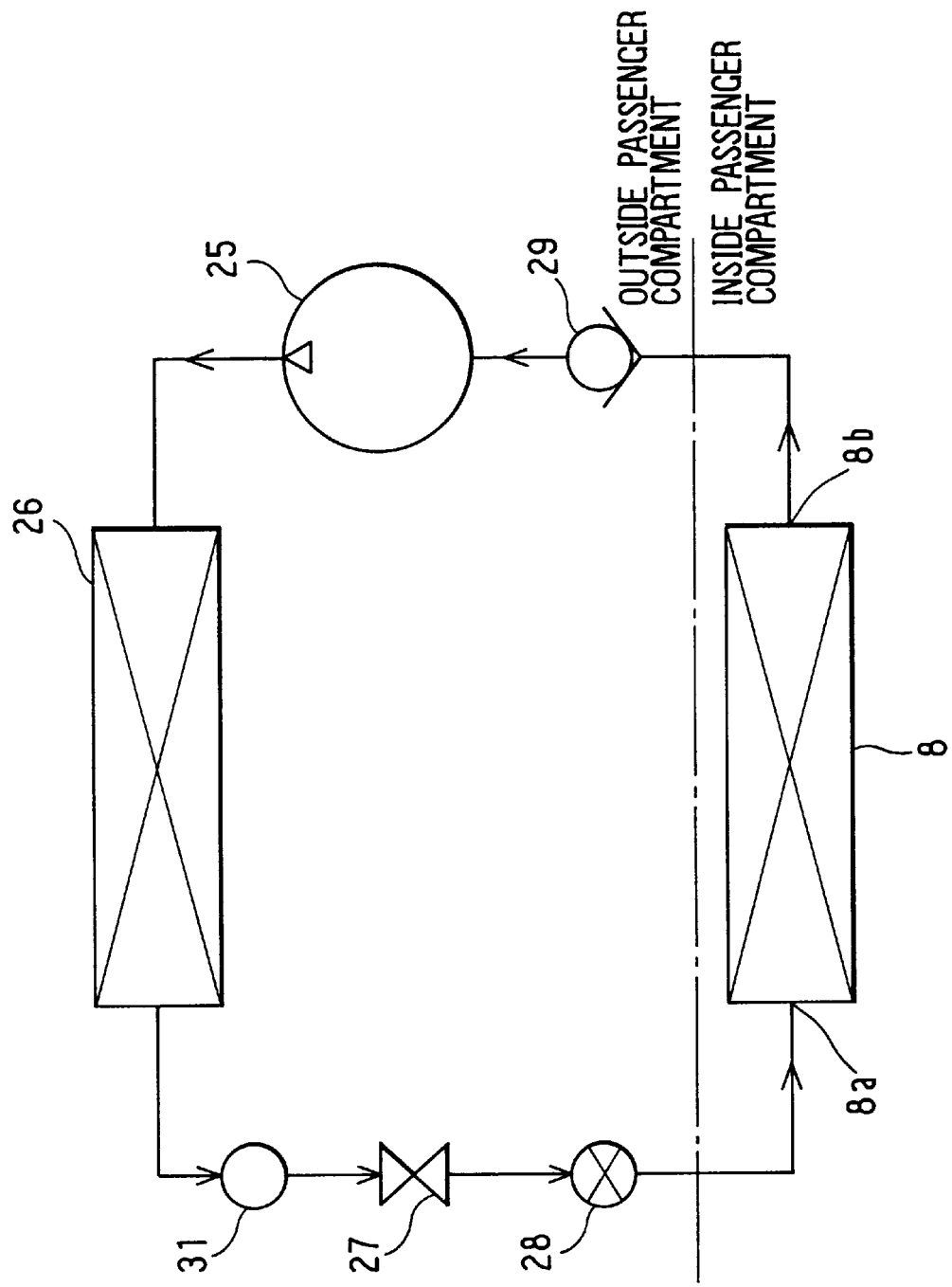
FIG. 2 is a schematic drawing of a refrigeration cycle according to the first embodiment.

The refrigeration cycle indicated in FIG. 2 is a vapor-compressing type refrigeration cycle employing a flammable refrigerant of propane gas or the like. A compressor 25 compresses the refrigerant by a driving force from the engine via an electromagnetic clutch (not illustrated). A condenser 26 condenses the refrigerant, and is generally disposed on the front side of an engine compartment. A pressure switch 31 for preventing the condenser 26 from being damaged due to abnormal rise in condensation pressure is provided on a downstream side of the condenser 26. This pressure switch 31 stops operation of the condenser 26 and prevents increase in pressure within the condenser 26 by switching off an electromagnetic clutch when pressure within the condenser 26 rises abnormally.

An expansion valve 27 as a pressure reducing device for refrigerant condensed by the condenser 26, and low-temperature and low-pressure refrigerant is evaporated in the evaporator 8. Air passing through the evaporator 8 is cooled by the latent evaporation heat of the expansion valve 27.

A solenoid valve 28 is disposed outside the passenger compartment on the inflow port 8a side of the evaporator 8, and a check valve 29 for stopping the refrigerant flowing into the evaporator 8 is disposed outside the passenger compartment on the discharge-port 8b side.

A microcomputer including a CPU, ROM, RAM, and the like (not illustrated) is incorporated in the controller 23, and as shown in FIG. 1, signals from the gas sensor 22 and an air conditioning apparatus starting switch (air conditioner switch) 30 are input to the above-described microcomputer. The controller 23 is connected to a battery (not illustrated) and controls the drive units 6, 12, 19 and 20, the blower motor 7b, the warning device 24, and the solenoid valve 28 according to signals from the gas sensor 22 and air conditioner switch 30. Furthermore, the air conditioner switch 30 is not turned to a "on" state unless a switch (not illustrated) of the blower 7 is turned on so as to operate the blower 7.

Figure 3:
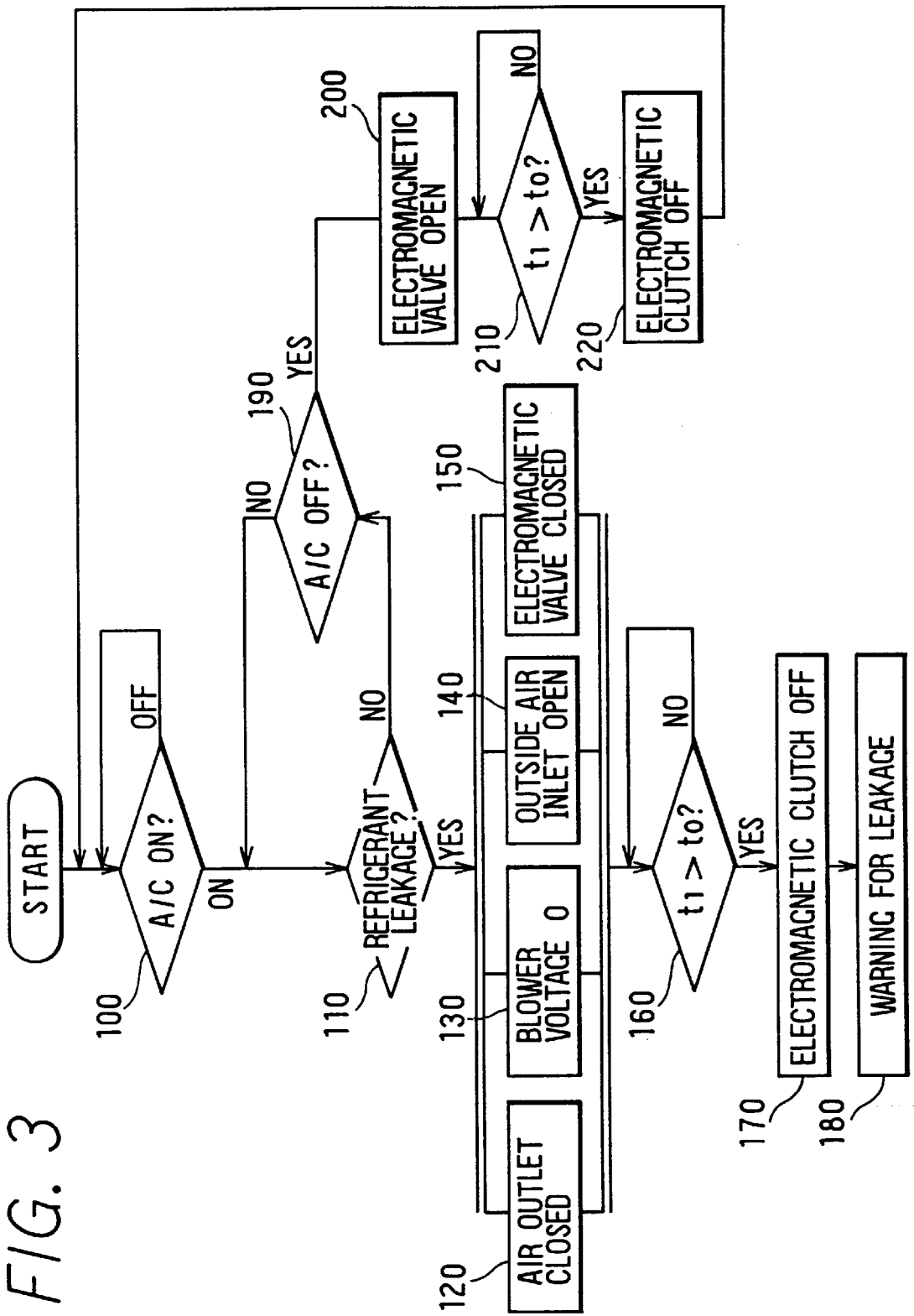
FIG. 3 is a control flowchart of the air conditioning apparatus for the vehicle according to the first embodiment.

Control process executed by the controller 23 will be described with reference to the flowchart in FIG. 3.

When it is determined by a signal from the air conditioner switch 30 that the air conditioning apparatus is operating (step 100), it begins to monitor the presence or absence of refrigerant leakage on a basis of a signal from the gas sensor 22 (step 110). When it is determined that refrigerant is leaking, the air outlets 13, 14 and 15 are respectively closed by the air outlet doors 16, 17 and 18 (step 120), the blower 7 is stopped (step 130), the outside air introduction inlet 3 is opened (step 140), and the solenoid valve 28 is closed (step 150).

When a predetermined time has elapsed since the solenoid valve 28 is closed (step 160), the electromagnetic clutch is switched off (step 170), and the compressor 25 is stopped. A refrigerant leakage warning is issued to the passenger (step 180). The above-mentioned predetermined time will be described later.

Meanwhile, when it is determined in step 110 that refrigerant has not leaked, the air conditioning apparatus is operated. When a stoppage of the air conditioning apparatus is instructed by the air conditioner switch 30 (step 190), the solenoid valve 28 is closed (step 200). When a predetermined time has elapsed after the solenoid valve 28 is closed (step 210), the electromagnetic clutch is switched off (step 220), and the compressor 25 is stopped.

Characteristics of this embodiment will be described.

When the leakage of refrigerant is detected during operation of the air conditioning apparatus for a vehicle, the air outlets 13, 14 and 15 are respectively closed by the air outlet doors 16, 17 and 18, and the refrigerant which has leaked from the air conditioner casing 1 can be stopped within the air conditioner casing 1. Consequently, it can be prevented that the interior of the passenger compartment is filled with the refrigerant.

Additionally, when leakage of refrigerant is detected during operation of the air conditioning apparatus for a vehicle, the compressor 25 is stopped after a predetermined time has elapsed since the solenoid valve 28 is closed, and the refrigerant within the evaporator 8 is sucked and discharged. Consequently, the amount of refrigerant leaking into the air conditioner casing 1 due to the damage of the evaporator 8 can be reduced, and it can be prevented that the interior of the passenger compartment is filled with the refrigerant. Further, because the solenoid valve 28 is closed and refrigerant does not circulate, the amount of refrigerant discharged from the compressor 25 can be reduced. Consequently, pressure within the condenser 26 is reduced, and the pressure switch 31 does not operate.

Herein, "predetermined time" is the time required for sucking out refrigerant within the evaporator 8, as described above, and in this embodiment, is approximately 30 seconds.

Further, when an instruction for stopping the operation is issued by the air conditioner switch 30 during the operation of the air conditioning apparatus for a vehicle, the operation of the compressor 25 is stopped after a predetermined time has elapsed since the solenoid valve 28 is closed, and the refrigerant within the evaporator 8 is sucked and discharged. Consequently, even if a damage occurs so that refrigerant leaks out from the evaporator 8 after the air conditioning apparatus for a vehicle is stopped, the refrigerant within the evaporator 8 has been sucked out and discharged, and the amount of refrigerant leaking out into the air conditioner casing 1 can be reduced.

Furthermore, the blower is stopped when leakage of refrigerant is detected during the operation of the air conditioning apparatus for a vehicle, and forced airflow toward the passenger compartment is not generated within the air passage 1*a*. Consequently, flow of leaked refrigerant into the passenger compartment can be suppressed.

Additionally, the check valve 29 is disposed on the discharge port 8*b* side of the evaporator 8, the refrigerant can be prevented from flowing into the evaporator 8. Consequently, the amount of refrigerant leaking into the interior of the passenger compartment can be suppressed.

Moreover, because the solenoid valve 28 and check valve 29 are disposed outside the passenger compartment, piping connection portions having a possibility of refrigerant leakage are disposed outside the passenger compartment. Consequently, leaked refrigerant can be suppressed from flowing into the passenger compartment.

Additionally, because the gas sensor 22 is disposed on the downstream air side of the evaporator 8, the gas sensor 22 is disposed in an atmosphere where refrigerant leaked from the evaporator 8. Consequently, the accuracy of the refrigerant leakage detection accuracy of the gas sensor 22 is improved.

The air outlet doors 16, 17 and 18 are utilized as an apparatus for opening or closing the passage in the first embodiment, but this invention can be also embodied by providing a door specially for closing the air passage 1*a* between the evaporator 8 and the air outlets 13, 14 and 15. However, it is preferred that the gas sensor 22 should be disposed between this door and the evaporator 8.

Additionally, since refrigerant flowing into the air conditioner casing 1 seems to leak out from the evaporator 8, the present invention can be also embodied also by adopting a door as an apparatus for opening or closing passage so as to cover the upstream and downstream air sides of the evaporator 8. However, it is preferred that the gas sensor 22 should be disposed between this door and the evaporator 8.

Moreover, the present invention can be also embodied by employing a solenoid valve instead of the check valve 29. Accordingly, the solenoid valve may be operated interlockingly with stoppage of an electromagnetic clutch.

Additionally, in the first embodiment, the operation of the compressor is stopped by switching off the electromagnetic clutch. However, in a case the compressor is operated by a special drive source for the compressor, such as a motor, engine, or the like, the compressor may be stopped by stopping this drive source.

Furthermore, the present invention is not exclusively applied only when a cooling function (compressor) is operated, but can be applied when a blowing function (ventilation function) or a heating function is operated.

Moreover, the air conditioning apparatus for a vehicle according to the present invention is not limited to a vehicle employing an internal combustion engine or the like, but can also be applied in an electrical automobile or the like.

A second embodiment according to the present invention will be described hereinafter with reference to the drawings.

Figure 4:
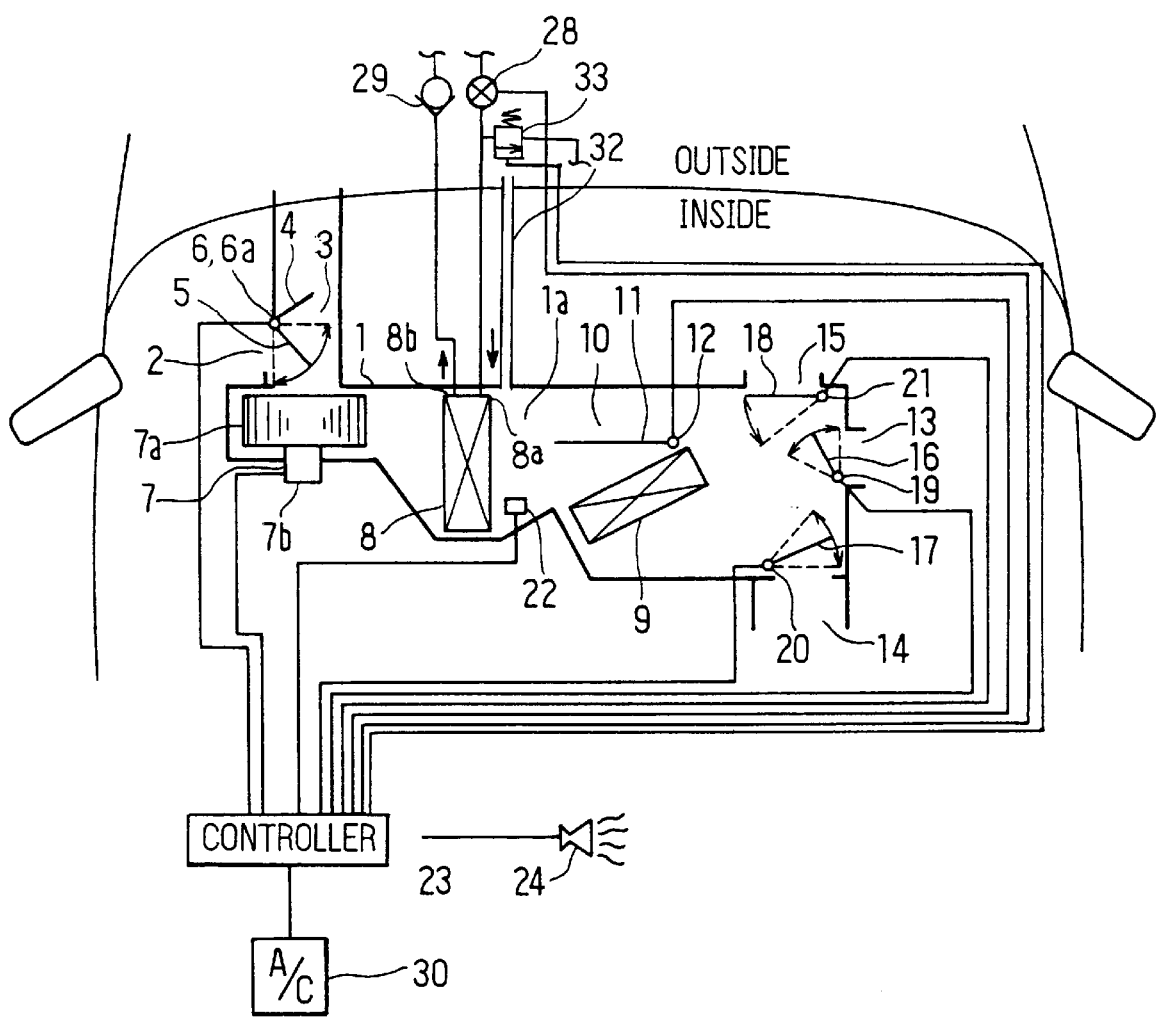
FIG. 4 is a schematic drawing indicating a ventilation system and a control system of an air conditioning apparatus for a vehicle according to a first embodiment of the present invention.

FIG. 4 is a schematic drawing of a ventilation system and control system of an air conditioning apparatus according to the second embodiment, and the air conditioning apparatus will be described with reference to FIG. 1.

In this embodiment, same or equivalent parts and components as in the first embodiment are shown with the same reference numerals, and description thereof is omitted.

In FIG. 4, an inside air introduction inlet door 4 and an outside air introduction inlet door 5 for opening or closing these two introduction inlets 2 and 3 are provided, and these two introduction inlet doors 4 and 5 are driven by drive unit 6 and 6*a* (specifically, a servomotor). A blower 7 is disposed at a downstream air side of the two introduction inlet doors 4 and 5.

A relief valve (third valve device) 33 are disposed outside of the passenger compartment on the inflow port 8*a* side of the evaporator 8 in addition to the solenoid valve (first valve device) 28.

Figure 5:
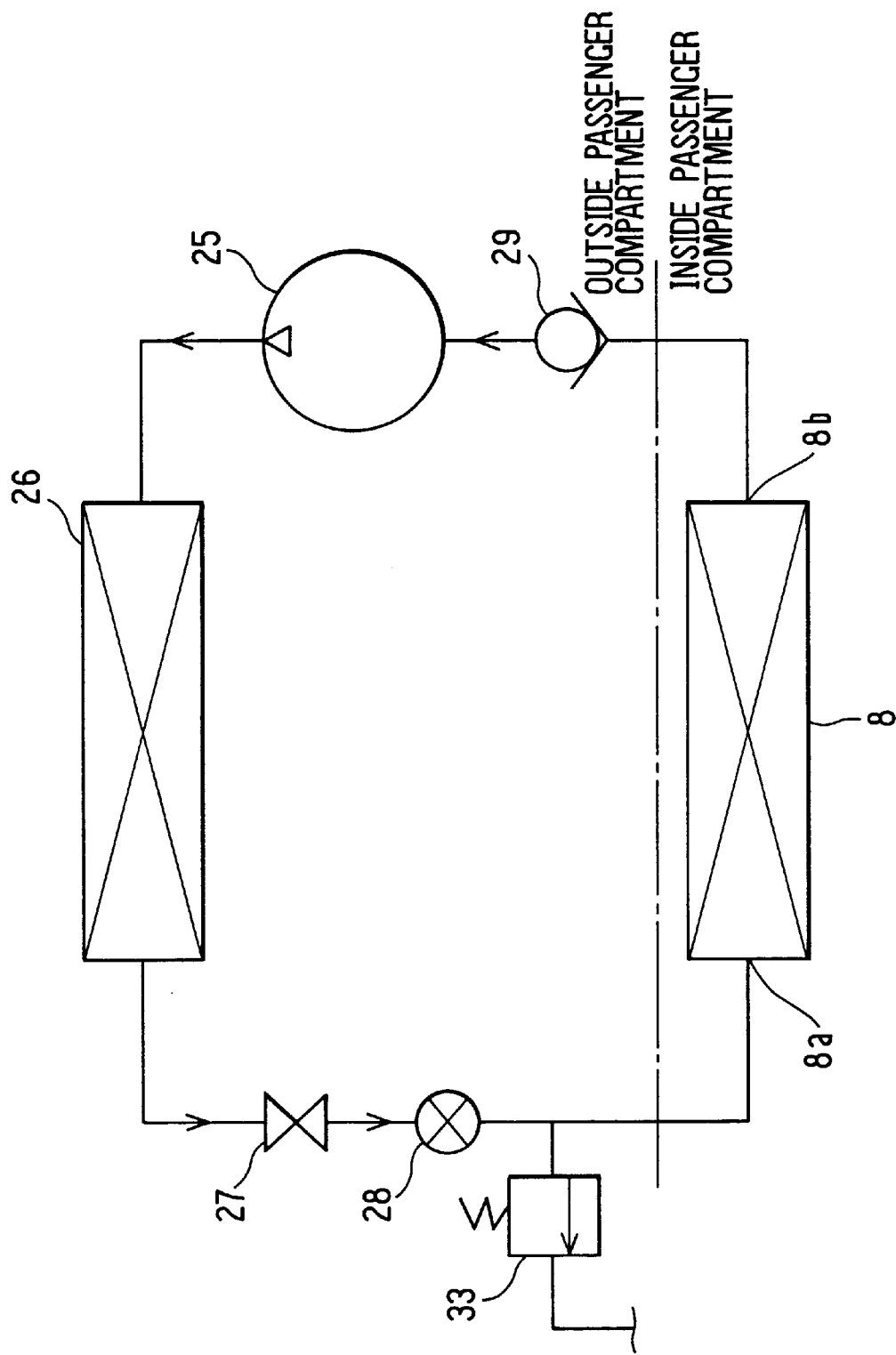
FIG. 5 is a schematic drawing of a refrigeration cycle according to the first embodiment.
Figure 6:
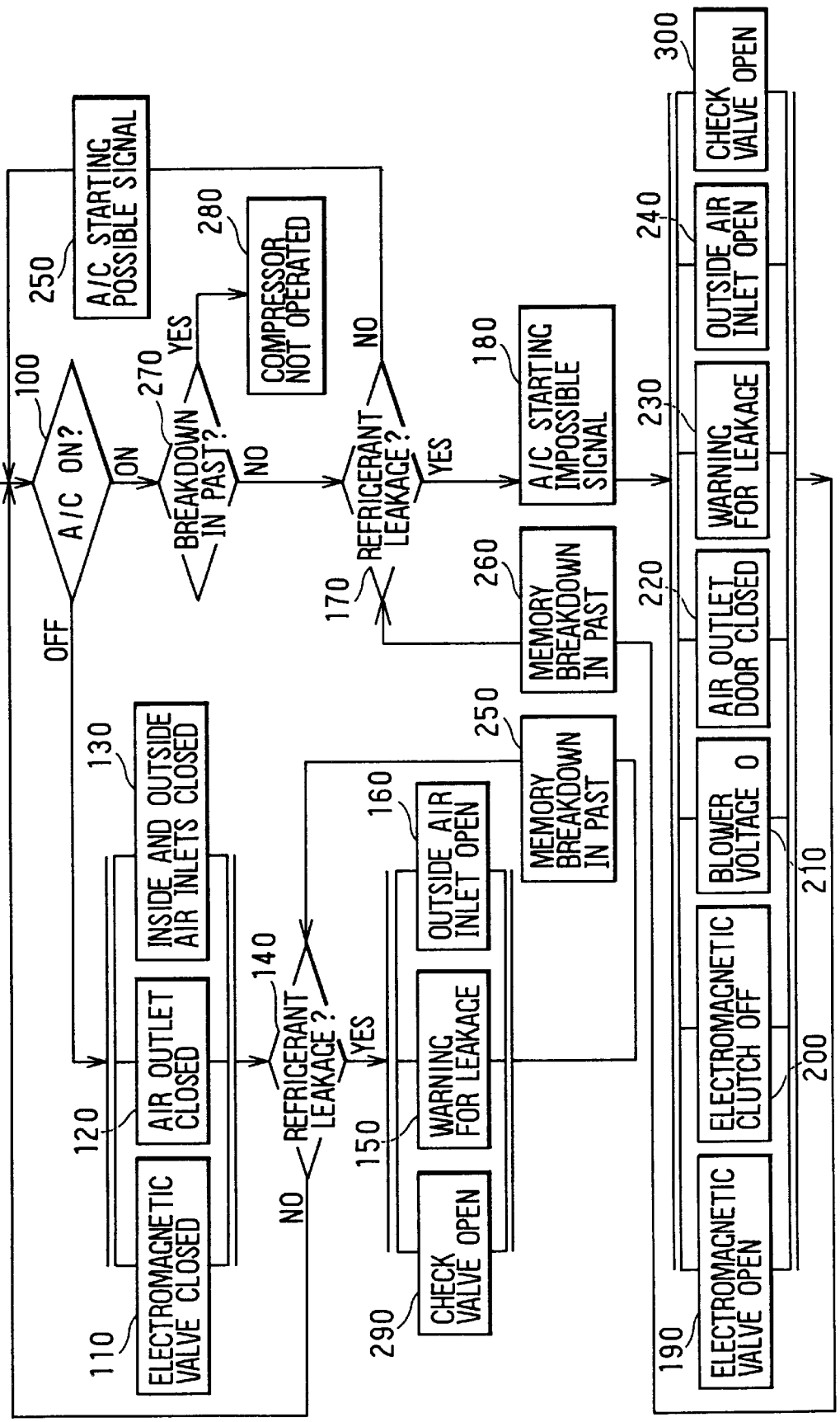
FIG. 6 is a control flowchart of the air conditioning apparatus for the vehicle according to the first embodiment.

Control process executed by the controller 23 will be described next with reference to FIG. 5 and the flowchart in FIG. 6.

When it is determined that the air conditioning apparatus has been stopped by a signal from the air conditioner switch 30 (step 100), the solenoid valve 28 is closed (step 110), the air outlets 13, 14 and 15 are respectively closed by the air outlet doors 16, 17 and 18 (step 120), and the two introduction inlets 2 and 3 are respectively closed by the two introduction inlet doors 4 and 5 (step 130).

Next, the presence or absence of refrigerant leakage is determined on a basis of a signal from the gas sensor 22 (step 140). Herein, when it is determined that refrigerant has leaked, a refrigerant-leakage warning is issued (step 150), the outside air introduction inlet door 4 is opened (step 160), and the relief valve 33 is opened (step 290).

Then, it is stored in memory that refrigerant leakage (breakdown) has occurred (step 250), and the control process of steps 150, 160 and 290 is performed until it is determined that refrigerant is not leaking (step 140). The open state of the relief valve 33 is maintained until the refrigerant leakage is repaired.

Meanwhile, when it is determined that an instruction for starting the air conditioning apparatus has been output by a signal from the air conditioner switch 30 (step 100), presence or absence of past refrigerant leakage (breakdown) is determined (step 270). Accordingly, when it is determined that refrigerant leakage (breakdown) did not exist in the past, presence or absence of refrigerant leakage is determined on a basis of a signal from the gas sensor 22 (step 170). Herein, when it is determined that refrigerant has leaked, a signal for prohibiting the air-conditioning apparatus from starting is output to an air conditioning controller (not illustrated) (step 180).

Next, the solenoid valve 28 is maintained in an open state (step 190), an "off" state of the electromagnetic clutch (i.e., stopped state of the compressor 25) is maintained (step 200), the stopped state of the blower 7 is maintained (step 210), the air outlets 13, 14 and 15 are respectively closed by the air outlet doors 16, 17 and 18 (step 220), a warning for refrigerant leakage is issued to the passenger (step 230), and the outside air introduction inlet 4 and relief valve 33 are opened (step 240 and step 300).

Then, it is stored in memory that refrigerant leakage (breakdown) has occurred (step 260), and the control process of steps 150 through 240 and step 300 is performed until it is determined that refrigerant is not leaking (step 170). The open state of the relief valve 33 and the "off" state of the electromagnetic clutch are maintained until the refrigerant leakage is repaired.

Meanwhile, when it has been determined in step 270 that refrigerant leakage (breakdown) existed in the past, only the heater function and the blower function are operated without operating the compressor 25, until the refrigerant leakage is repaired.

Additionally, when it has been determined in step 170 that refrigerant has not leaked, a signal for starting the operation of the air conditioning apparatus is output to the controller. Consequently, the air conditioning apparatus does not operate until the signal for starting the operation of the air conditioning apparatus is output (step 250).

Characteristics of this embodiment will be described next.

When the air conditioning apparatus is stopped, the air outlets 13, 14 and 15 are respectively closed by the air outlet doors 16, 17 and 18. Therefore, even when refrigerant leaks into the air conditioner casing 1 while the air conditioning apparatus is not operated, such as when parked, the refrigerant can be stopped within the air conditioner casing 1. Consequently, it can be prevented that the interior of the passenger compartment is filled with the refrigerant.

Additionally, the check valve 29 is disposed on the discharge-port 8b side of the evaporator 8, and moreover, the solenoid valve 28 of inflow port side is closed when the engine is stopped, and the maximum amount of refrigerant which leaks from the evaporator 8 while the air conditioning apparatus is not operated, such as when parked, can be only the amount remaining within the evaporator 8. Consequently, the entire amount of the refrigerant does not leak out, and the amount of refrigerant leaking into the interior of the passenger compartment can be suppressed.

Furthermore, when the detected value detected by the gas sensor 22 is a predetermined value or more, refrigerant existing between the solenoid valve 28 and the check valve 29 can be discharged outside the passenger compartment by opening the relief valve 33, and the amount of refrigerant leaking into the interior of the passenger compartment can further be reduced.

Additionally, when refrigerant leakage occurs, a warning is issued by the warning device 24, and therefore, the passenger can be prevented from mistakenly boarding the passenger compartment of the vehicle when parked. That is, in step 150, a warning for giving the passenger notice of the refrigerant leakage or the like may be issued before the passenger re-boards the vehicle.

Moreover, the electromagnetic clutch is maintained in the "off" state as in step 200 even when the air conditioner switch is switched in a state where leakage of refrigerant has occurred when starting the air conditioning apparatus, and the compressor 25 is not operated. Consequently, refrigerant pressure within the refrigeration cycle does not rise, a differential between refrigerant pressure in the refrigeration cycle and atmospheric pressure does not expand, and refrigerant leakage can further be prevented. Since the compressor 25 does not operate while being in a state where the amount of refrigerant has decreased, problems such as seizure or the like of the compressor 25 can be prevented.

Since the blower is not operated while being in a state where leakage of refrigerant has occurred when starting the air conditioning apparatus, forced airflow within the air passage 1a toward the passenger compartment does not occur. Consequently, the leaked refrigerant can be suppressed from flowing into the passenger compartment.

In addition, because the two introduction inlets 2 and 3 are closed and the air outlets 13, 14 and 15 are closed when the air conditioning apparatus is stopped, the air passage 1a formed in the air conditioner casing 1 becomes a closed space. Consequently, concentration of refrigerant flowing into the air passage 1a (for example, refrigerant which has leaked from the evaporator 8) becomes higher than in a case where the air passage 1a is opened, and the probability of the refrigerant leakage being detected by the gas sensor 22 becomes high. As a result, refrigerant leakage detection accuracy of the gas sensor 22 can be increased.

Additionally, because the solenoid valve 28, check valve 29, and relief valve 33 are disposed outside the passenger compartment, piping connection portions having a high possibility of refrigerant leakage are disposed outside of the passenger compartment. Consequently, the leaked refrigerant can be suppressed from flowing into the passenger compartment.

Furthermore, the compressor 25 is not operated when an instruction for starting the operation of the air conditioning apparatus for a vehicle has been issued by the air conditioner switch 30 in a case where refrigerant leakage (breakdown) existed in the past, and problems such as seizure or the like of the compressor 25 can be prevented.

The check valve 29 may be also employed as an intake valve for the compressor 25.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. An air conditioning apparatus for a vehicle having a passenger compartment, comprising:

an air conditioner casing for forming an air passage therein, said air passage having an air outlet on an downstream air side thereof so as to be open to said passenger compartment;

an evaporator disposed within said air conditioner casing, said evaporator cooling air flowing into said passenger compartment by using latent evaporation heat of a flammable refrigerant;

air passage opening-closing means for opening or closing said air passage, said air passage opening-closing means being disposed on an downstream air side of said evaporator within said air conditioner casing;

refrigerant detecting means for detecting refrigerant disposed within said air conditioner, casing to detect said refrigerant which has flowed within said air passage; and opening-closing control means for controlling said air passage opening-closing means so as to close said air passage when a detected value of said refrigerant detecting means is a predetermined value or more.

2. An air conditioning apparatus according to claim 1, wherein:

said opening-closing control means controls air passage opening-closing means so as to close said air passage when a detected value of said refrigerant detecting means for detecting refrigerant during an operation of said air conditioning apparatus is a predetermined value or more.

3. An air conditioning apparatus according to claim 2, wherein:

said evaporator is provided with an inflow port into which said refrigerant flows and a discharge port out from which said refrigerant flows.

4. An air conditioning apparatus according to claim 3, further comprising:

a solenoid valve disposed on a side of said inflow port to control through flow of said refrigerant flowing through said inflow port;

a compressor for compressing said refrigerant; and first stopping means for stopping said compressor after a predetermined time has elapsed since said solenoid valve is closed, when a detected value of said refrigerant detecting means for detecting refrigerant during an operation of the air conditioning apparatus is a predetermined value or more.

5. An air conditioning apparatus according to claim 3, further comprising:

a solenoid valve disposed on a side of said inflow port to control said refrigerant flowing through said inflow port;

a compressor for compressing said refrigerant;

instruction means for instructing a stop of the air conditioning apparatus; and second stopping means for stopping said compressor after a predetermined time has elapsed since said solenoid valve is closed, when a stop of the air conditioning apparatus has been instructed by said instruction means during an operation of the air conditioning apparatus.

6. An air conditioning apparatus according to claim 2, further comprising:

a blower for blowing air in said passenger compartment; and blower stopping means for stopping an operation of said blower, when a detected value of said refrigerant detecting means for detecting refrigerant during an operation of the air conditioning apparatus is a predetermined value or more.

7. An air conditioning apparatus according to claim 6, further comprising:

stop instruction means for instructing a stop of the air conditioning apparatus; wherein:

said air passage opening-closing means closes said air passage when a stop of the air conditioning apparatus has been instructed by said stop instruction means.

8. An air conditioning apparatus for a vehicle having a passenger compartment, comprising:

an air conditioner casing for forming an air passage therein, said air passage having an air outlet on a downstream air side thereof so as to be open to said passenger compartment;

an evaporator disposed within said air conditioner casing, said evaporator cooling air flowing into said passenger compartment by using latent evaporation heat of a flammable refrigerant;

air passage opening-closing means for opening or closing said air passage, said air passage opening-closing means being disposed on a downstream air side of said evaporator within said air conditioner casing;

opening-closing control means for controlling said air passage opening-closing means so as to close said air passage when the air conditioning apparatus is stopped;

start instruction means for instructing a starting of the air conditioning apparatus;

refrigerant detecting means for detecting refrigerant which has flowed within said air passage, said refrigerant detecting means being disposed within said air conditioner casing on an upstream air side of said air passage opening-closing means; and maintaining means for controlling air passage opening-closing means so as to maintain said air passage in a closed state if a detected value of said refrigerant detecting means is a predetermined value or more when a starting of the air conditioning apparatus has been instructed by said start instructing means.

9. An air conditioning apparatus according to claim 8, further comprising;

a blower for flowing air within a passenger compartment;

blower maintaining means for maintaining a stop of said blower in a stopped state if a detected value of said refrigerant detecting means is a predetermined value or more when a starting of the air conditioning apparatus has been instructed by said start instruction means.

10. An air conditioning apparatus according to claim 8, further comprising:

a compressor for compressing said refrigerant; and compressor maintaining means for maintaining said compressor in a stopped state if a detected value of said means for detecting refrigerant is a predetermined value or more when a starting of the air conditioning apparatus has been instructed by said start instruction means.

11. An air conditioning apparatus according to claim 8, wherein:

said air passage includes:

an inside air introduction inlet disposed in an upstream air side within said air conditioner casing to introduce air inside said passenger compartment;

an outside air introduction inlet disposed on an upstream air side within said air conditioner casing to introduce air outside said passenger compartment.

12. An air conditioning apparatus according to claim 11, further comprising:

inside/outside air opening-closing means for opening or closing said inside air introduction inlet and said outside air introduction inlet; and inside/outside air control means for controlling inside/outside air opening-closing means so as to close both said outside air introduction inlet and said outside air introduction inlet when the air conditioning apparatus is stopped.

13. An air conditioning apparatus according to claim 8, wherein:

said evaporator is provided with an inflow port into which said refrigerant flows and a discharge port out from which said refrigerant flows.

14. An air conditioning apparatus according to claim 13, further comprising:

first valve means disposed on a side of said inflow port to control said refrigerant flowing through said inflow port; and second valve means disposed on a side of said discharge port to control said refrigerant flowing through said discharge port, wherein:

said two valve means interrupts said refrigerant flowing into said evaporator when the air conditioning apparatus is stopped.

15. An air conditioning apparatus according to claim 14, further comprising:

third valve means disposed between said first valve means and said second valve means, wherein:

said third valve means is operated so as to discharge refrigerant existing between said first and second valve means to outside said passenger compartment when a detected value of said refrigerant detecting means is a predetermined value or more.

16. An air conditioning apparatus according to claim 15, wherein:

said first through third valve means are disposed outside said passenger compartment.

* * * * *